United States Patent [19]

Laughlin

[11] Patent Number: 4,848,071
[45] Date of Patent: Jul. 18, 1989

[54] HAND PECAN HARVESTER

[76] Inventor: James E. Laughlin, 11515 Stark, Kansas City, Mo. 64134

[21] Appl. No.: 152,974

[22] Filed: Feb. 8, 1988

[51] Int. Cl.⁴ .......................................... A01D 51/00
[52] U.S. Cl. ................................................ 56/328.1
[58] Field of Search .............................. 56/328.1, 332; 294/19.2, 19.1

[56] References Cited

U.S. PATENT DOCUMENTS

| | | | |
|---|---|---|---|
| 2,540,857 | 2/1951 | Bagley | 56/328.1 |
| 2,736,157 | 2/1956 | Weathersby | 294/19.2 |
| 2,788,630 | 4/1957 | Nisbet | 294/19.2 |
| 2,835,099 | 5/1958 | Touchberry | 294/19.2 |
| 2,864,228 | 12/1958 | Griffith, Jr. | 56/328.1 |
| 2,972,851 | 2/1961 | Goehring | 56/328.1 |
| 3,026,666 | 3/1962 | Baugh, Jr. | 294/19.2 |
| 3,115,740 | 12/1963 | Hartley | 56/328.1 |
| 4,322,939 | 4/1982 | McDonald | 56/328.1 |
| 4,412,697 | 11/1983 | Verde | 294/19.2 |

Primary Examiner—Paul J. Hirsch
Attorney, Agent, or Firm—Hovey, Williams, Timmons & Collins

[57] ABSTRACT

A lightweight hand pecan harvester is provided which is efficient and easy to use. A harvesting/storage component includes a hopper having two open ends. A bottom end is provided with a series of parallel wire bails secured by brackets to the hopper walls. The bottom stretch of the bails is coplanar with the bottom of the hopper and adapted to be biased laterally, thereby enabling pecans to pass therebetween. Once a pecan enters the hopper, the bails return to their spaced, parallel relationship, preventing the pecans from falling out of the opening at the bottom of the hopper. The other end of the hopper is open so that the pecan harvester when inverted may be emptied of the pecans collected therein. A handle is provided to enable the person gathering the pecans to walk upright while gathering.

1 Claim, 1 Drawing Sheet

U.S. Patent  Jul. 18, 1989  4,848,071
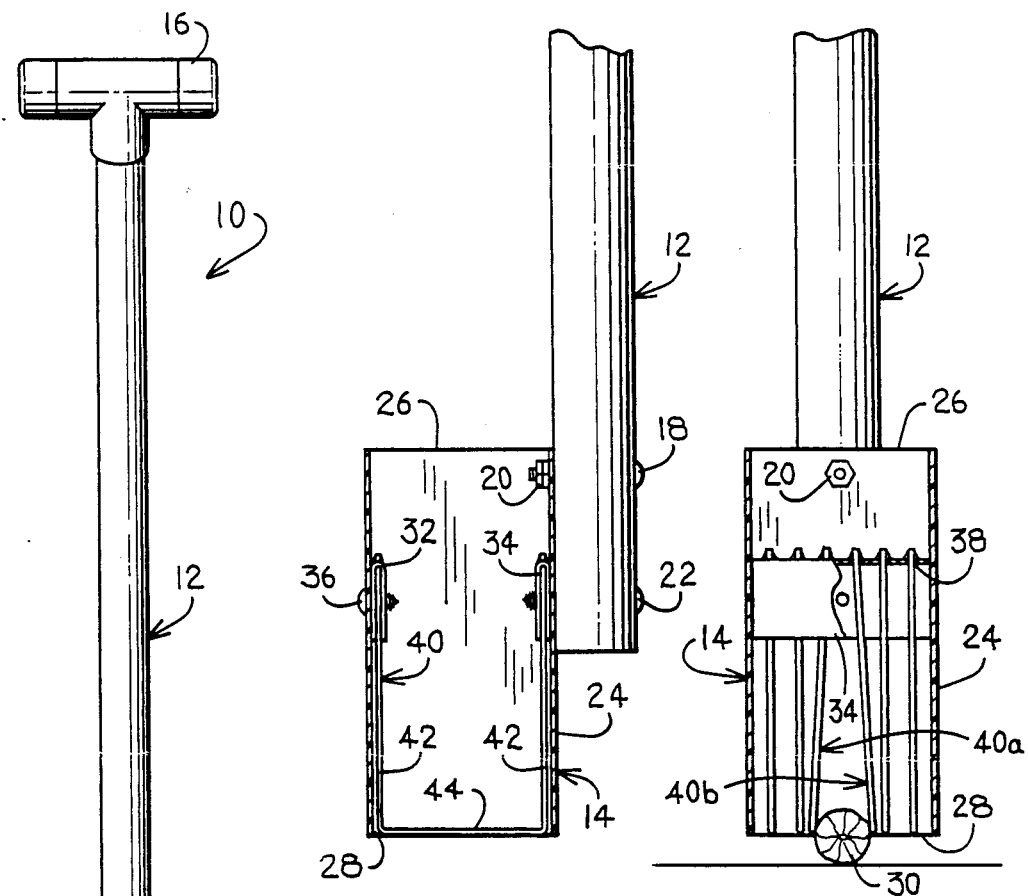
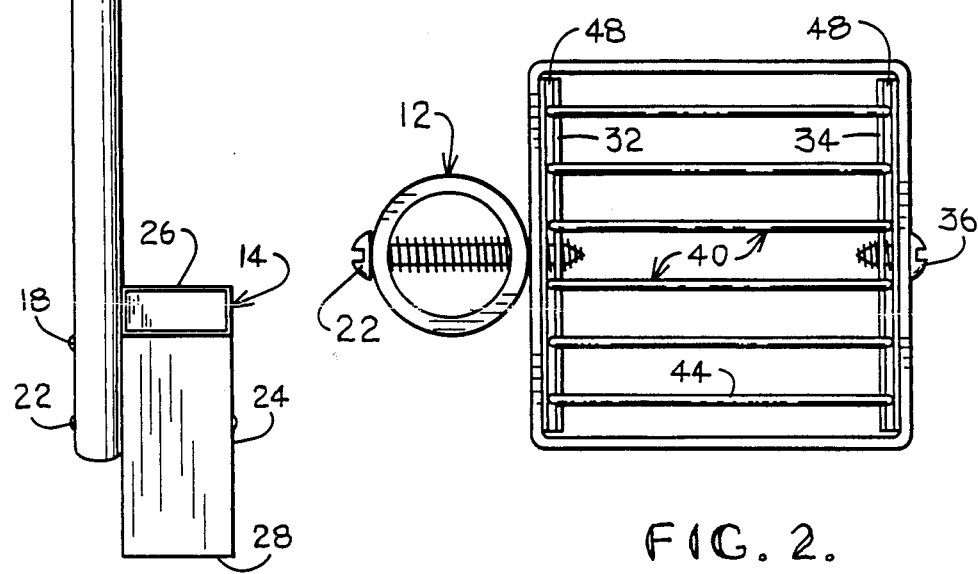

HAND PECAN HARVESTER

BACKGROUND OF THE INVENTION

1. Field of the Invention

A hand pecan harvester which is both economical to construct and simple to use is provided which enables pecan gatherers to efficiently collect pecans which have fallen to the ground. The invention is particularly concerned with a pecan harvester having a handle and a harvesting/storage component so that the gatherer may walk erectly to collect pecans within the hopper of the harvesting/storage component. Laterally biased spring like bails are attached to mounting brackets on opposing walls of the hopper and lie in parallel, vertical planes. Stretches at the bottom of each bail extend across and are coplanar with the bottom of the hopper. Pecans may enter the hopper by biasing the bottom stretches of the bails laterally to pass therebetween, and are retained in the hopper when the bails, held by mounting brackets, return to their original position.

2. Description of the Prior Art

In many parts of the southern half of the United States, the pecan tree grows native or has been planted and cultivated by man. The value of its nuts as a commercial commodity has long been recognized and many large commercial organizations operate profitably in the pecan collecting business through the use of large pieces of machinery to shake the tree and collect the fallen pecan nuts on large fabric sheets. Pecans which have fallen to the ground are smooth shelled nuts as opposed to walnuts and other nuts with a pulp over the shell and thus ready for use or sale when gathered.

However, the pecan is also a valued resource for individuals cultivating only a few trees and those who gather the pecans from native forests. In such circumstances, the gatherer has long been forced to stoop and bend to gather nuts from unprepared ground. The ground may be muddy or the pecans may be scattered among leaves, twigs or branches which have fallen to the ground. This is especially burdensome during extended gathering and for the elderly gatherer.

A prior gathering tool which included an unrestrained coil spring on a handle has been proven ineffective in gathering pecans from the ground. These earlier devices failed to provide a hopper to store the pecans until the tool could be emptied. Additionally, the unrestrained coils were ineffective in picking up the pecans from the ground. As a result, many or most who have acquired the prior tool have abandoned it in favor of collecting the pecans by hand.

SUMMARY OF THE INVENTION

The present hand pecan harvester solves the problem of providing an apparatus for gathering pecans by hand without bending and stooping to pick them up. The harvester includes both a handle, to permit the user to stand erect and a harvesting/storage component for gathering and temporarily storing the pecans collected from the ground.

The harvesting/storage component includes a hopper which is advantageously provided with an open upper end for emptying pecans gathered therein. The tubular hopper is rectangular or square in cross-section and is provided with a series of parallel wire bails spanning the bottom of the hopper.

In more detail, the wire bails are attached to the hopper by a pair of opposed, inverted U-shaped brackets. The bails are mounted at the closed end of the U-shaped bracket and are evenly spaced along the bracket. The series of bails are thus both parallel to each other and have bottom stretches which are coplanar with the bottom of the hopper. The bails are springlike and mounted to move laterally in the brackets.

When the harvester is placed over a pecan the pecan nut locates itself between two of the bails, causing the bails to move laterally as the hopper is pressed over the pecan. The pecan being elliptically shaped, the bails move laterally as the bottom stretch of the bail moves over the arcuate upper surface of the pecan. After the minor axis of the pecan moves past the bottom stretch of the bail and into the interior of the hopper, the pecan is propelled into the hopper as the bails close beneath the pecan. The pecan is thus prevented from dropping out of the hopper by the bails which have returned to their original, parallel position. The pecans may be conveniently emptied from the hopper into a bucket or bag simply by inverting the pecan harvester so that the pecans roll out of the open, upper end of the hopper.

BRIEF DESCRIPTION OF THE DRAWINGS

FIG. 1 is a perspective view of the hand pecan harvester;

FIG. 2 is an enlarged, bottom plan view;

FIG. 3 is an enlarged fragmentary vertical, side sectional view taken through the harvesting/storage component of the pecan harvester; and FIG. 4 is an enlarged fragmentary vertical, front sectional view showing the lateral movement of the bails to accommodate entry of a pecan into the hopper.

DESCRIPTION OF THE PREFERRED EMBODIMENT

A hand pecan harvester 10 for simply and economically harvesting pecans which have fallen to the ground broadly includes a handle 12, and harvesting/storage component 14. The handle 12 and component 14 may be manufactured separately and assembled, as shown in the drawings, or formed as a unitary, one-piece member.

Handle 12 includes grip 16 which provides a convenient and comfortable means of grasping the pecan harvester 10. Grip 16 may be formed into a T-shape as shown in FIG. 1, enabling the user to hold the grip 16 ahead, behind or directly over the shank portion of the handle 12.

The handle 12 extends down from the grip 16 to the harvesting/storage component 14 permitting the harvester to maintain grip 16 approximately waist high during harvesting. The handle 12 may be constructed of lightweight materials, such as polyvinylchloride or other synthetic resin materials, inasmuch as little force need be applied to handle 12 to gather pecans into the harvesting/storage component 14.

Harvesting/storage component 14 is attached to handle 12 by a bolt 18, hexnuts 20, and sheet metal screw 22 extending through the handle 12 and a hopper 24. The hopper 24, which is preferably tubular and has a square or rectangular horizontal cross-sectional configuration, as shown in FIG. 2, is mounted in parallel alignment with handle 12 and has an open upper end 26 nearest grip 16.

The walls of the hopper 24 are planar and oriented at right angles to one another, thus presenting a uniform square or rectangular cross-section throughout the length of the hopper 24. Opposite open upper end 26 is open bottom end 28 through which pecans 30 may enter the hopper 24 as shown in FIG. 4. The hopper 24 may be constructed in any length or cross-sectional area depending on the number of pecans 30 to be carried therein, but should at least be wide enough to allow large pecans 30 to easily pass through bottom end 28, through hopper 24 and out open upper end 26.

A pair of U-shaped brackets 32 and 34 are mounted to the interior of hopper 24 intermediate upper end 26 and bottom end 28. The U-shaped brackets 32 and 34 are secured to opposite walls of the hopper 24 by sheet metal screws 36 and 22, respectively. Each U-shaped bracket 32 and 34 is mounted so that its open end faces downwardly toward bottom end 28 and the bight of the bracket is oriented toward upper end 26 of the hopper 24. The bight of each bracket 32 and 34 is also provided with a series of evenly spaced holes 38. The holes 38 are spaced approximately ⅜ of an inch apart.

A wire bail 40 is inserted through each hole 38 in the U-shaped brackets 32 and 34 and soldered in place. The wire used to form the bail is preferably steel wire approximately 0.05 to 0.06 of an inch in diameter. Each bail 40 includes a pair of vertically depending members or legs 42 positioned adjacent the opposite walls of the hopper 24 on which the U-shaped brackets 32 and 34 are mounted. The legs 42 are opposed to each other, are mounted in the same vertically extending plane and are joined by a bottom stretch 44 which is substantially orthogonal to the members 42.

The bails 40 are juxtaposed to one another with their bottom stretches 44 extending horizontally in a direction normal to the opposed walls of the hopper 24 on which brackets 32 and 34 are mounted. The legs of each bail 40 thus initially pass through corresponding holes 38 in the bights of U-shaped brackets 32 and 34, through the open ends of brackets 32 and 34, to position the bottom stretch 44 of each bail in a position spanning the bottom end 28. The bails 40 are U-shaped with the bottom 44 of each bail 40 substantially coplanar with the bottom end 28 of hopper 24. Because the holes 38 are evenly spaced, the bails 40 are spaced roughly 0.25 to 0.50 inches and preferably ⅜ of an inch apart in parallel across the ground engaging end 28 of the hopper 24.

In use, the pecan harvester 10 is operated to quickly and efficiently gather pecans 30 inside the harvesting/storage component 14 by simply placing the harvester 10 over a pecan 30 with the bottom stretches 44 of bails 40 extending parallel to the major axis of the typically elliptically-shaped pecan 30. The pecan 30, having an arcuate shell, locates itself between the bottom stretches of two bails 40a and 40b as shown in FIG. 4. If the pecan 30 is misaligned with the bails 40a and 40b, the gatherer need only move the grip 16 from side to side to properly align the harvester 10 with the pecan 30. As the gatherer presses down on the handle 12, only minimum force is required to bias springlike bails 40a and 40b apart, thereby allowing pecan 30 to enter the bottom end 28 of hopper 24.

Bail legs 42 are free to swing in a channel 48 defined by U-shaped brackets 32 and 34 in a direction normal to the alignment of the bottom stretches 44. As the pecan 30 passes into the hopper 24, the springlike bails 40a and 40b close to their original, evenly spaced-apart position, preventing the pecan 30 from dropping through the bottom end 28 of the hopper 24.

The use of lightweight spring wire for the bails 40 permits the pecan harvester 10 to be used even on muddy or unprepared ground. Twigs, leaves and the like do not clog the harvesting/storage component 14 inasmuch as they generally either do not enter the hopper 24 through bails 40 or fall back through the bails 40 after entering.

The gatherer may thus collect pecans 30 in the harvesting/storage component 14 until it is full or until the weight of the pecans 30 carried therein becomes fatiguing. The gatherer then may invert the pecan harvester 10, allowing the pecans 30 collected in the harvesting/storage component 14 to empty out the upper end 26 into a bag, bucket or other receptacle. This is especially convenient if the gatherer carries a bag or bucket on his or her belt, inasmuch as the pecan harvester 10 is constructed to be quickly emptied and then returned to use.

It is believed that the embodiment of the invention disclosed for illustrative purposes will be recognized by those skilled in the art as providing a hand pecan harvester which is substantially improved over what has heretofore been known and available. Various modifications and changes in details of construction from those herein disclosed to illustrate the principles and substances of the invention could be made without departing from the gist of the invention as herein illustrated and described. Accordingly, it should be understood that my invention is intended to be limited only by the scope of the claims which follow and to extend to the subject matter of the latter and the mechanical equivalents thereof.

I claim:

1. A hand pecan harvester comprising:
   a handle including a horizontally extending grasping member at a first end of said handle;
   a hopper mounted to an opposed second end of said handle, said hopper being in the form of a tubular member having normally upper and lower open ends and four walls, each of the walls presenting a lowermost edge at the lower end of the hopper which edge is proximal to the ground when the harvester is in use, said edges being coplanar to define the open end; and
   a plurality of U-shaped spring wire bails mounted interior to the hopper by a pair of brackets to two opposed walls of said hopper in spaced, parallel vertical planes, each bail having a pair of vertical legs extending normally downward adjacent a respective opposed wall and having a substantially horizontal bottom stretch extending generally normal to said opposing walls, each stretch being coplanar with the edges of the hopper.

* * * * *